US008001282B2

(12) United States Patent
Boyd et al.

(10) Patent No.: US 8,001,282 B2
(45) Date of Patent: Aug. 16, 2011

(54) VIRTUALIZATION AWARE HARD DRIVE

(75) Inventors: James A. Boyd, Hillsboro, OR (US);
Amber Huffman, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 370 days.

(21) Appl. No.: 11/769,232

(22) Filed: Aug. 14, 2007

(65) Prior Publication Data
US 2009/0049204 A1    Feb. 19, 2009

(51) Int. Cl.
G06F 3/00     (2006.01)
G06F 9/455    (2006.01)
G06F 9/46     (2006.01)

(52) U.S. Cl. ............... 710/5; 718/1; 718/102; 718/103

(58) Field of Classification Search .................. None
See application file for complete search history.

(56) References Cited

U.S. PATENT DOCUMENTS

| | | | | |
|---|---|---|---|---|
| 6,003,065 | A | * | 12/1999 | Yan et al. .............. 709/201 |
| 6,496,847 | B1 | * | 12/2002 | Bugnion et al. ............... 718/1 |
| 7,480,754 | B2 | * | 1/2009 | Priborsky et al. .......... 710/112 |
| 2006/0064697 | A1 | * | 3/2006 | Kagi et al. ................ 718/103 |
| 2006/0075147 | A1 | * | 4/2006 | Schoinas et al. ............. 710/3 |
| 2006/0224816 | A1 | * | 10/2006 | Yamada et al. ............. 711/6 |
| 2007/0244972 | A1 | * | 10/2007 | Fan ................. 709/205 |
| 2008/0126614 | A1 | * | 5/2008 | Ooi et al. ................ 710/38 |
| 2008/0137677 | A1 | * | 6/2008 | Boyd et al. .............. 370/419 |

* cited by examiner

*Primary Examiner* — Henry W Tsai
*Assistant Examiner* — Kris Rhu
(74) *Attorney, Agent, or Firm* — B. Delano Jordan; Jordan IP Law, PC

(57) ABSTRACT

A system and method for a virtualization aware hard drive. A method may include issuing a context command and an input/output (I/O) command by a virtual machine to either a hardware controller or a virtual machine monitor (VMM). The controller (or VMM) fills in a context tag that corresponds to the context command and the I/O command. The controller (or VMM) provides the context tag and the I/O command to a virtualization aware hard drive. The context tag provides context to the hard drive for the I/O command. Other embodiments are described and claimed.

22 Claims, 4 Drawing Sheets

VIRTUALIZATION AWARE HARD DRIVE

BACKGROUND

In general, a virtualized platform is a single physical platform that is segregated into a plurality of virtual machines (VMs). The physical platform incorporates at least one virtual machine monitor (VMM). A conventional VMM typically runs on a computer and presents to other software the abstraction of one or more virtual machines. Each virtual machine may function as a self-contained platform, running its own "guest operating system" (i.e., an operating system (OS) hosted by the VMM) and other software, collectively referred to as guest software.

Processes running within a virtual machine are provided with an abstraction of some hardware resources and may be unaware of other virtual machines within the system. A hypervisor provides the visualization abstraction of computer systems underneath it. Every virtual machine assumes that it has full control over the hardware resources allocated to it.

The VMM is an entity that is responsible for appropriately managing and arbitrating system resources among the virtual machines including, but not limited to, hard drives, processors, input/out (I/O) devices and memory. Currently a hard drive that is shared between multiple virtual machines requires that the VMM trap all requests or commands destined for the hard drive. Otherwise, the various virtual machines may have programmed different settings for the hard drive that can be detrimental to one or more of the virtual machines. An example is when virtual machines have different settings for the size of data blocks to be transferred. Here, if requests or commands are not trapped by the VMM, a hang condition may result for the virtual machine whose setting is not observed by the hard drive.

DETAILED DESCRIPTION

Various embodiments of the invention may be generally directed to a system and method for a virtualization aware hard drive. In an embodiment, virtual machines in the virtualized platform issue context commands to a controller (or the VMM) to inform the virtualization aware hard drive how each of the virtual machines wants the hard drive to behave when an I/O command is issued to the hard drive by the particular virtual machine. The controller (or the VMM) tills in a context tag or VMTag that corresponds to the virtual machine that issued the I/O command. The VMTag provides context to the virtualization aware hard drive on each I/O command issued from a virtual machine. The controller (or the VMM) arbitrates between virtual machine issued I/O commands and ensures that an I/O command from one virtual machine is not sent to the virtualization aware hard drive while another virtual machine has one or more outstanding I/O commands on the hard drive. In embodiments where hardware (e.g., the controller) fills in the VMTags and arbitrates between virtual machine issued I/O commands, the virtualization aware hard drive relieves the burden of the VMM in a virtualized platform from trapping all input/output (I/O) commands to the hard drive. In embodiments where the VMM fills in the VMTags and arbitrates between virtual machine issued I/O commands, the virtualization aware hard drive relieves the VMM of the burden of issuing feature setting changes on virtual machine switches, but the VMM still has the burden of trapping all I/O commands to fill in the VMTags. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
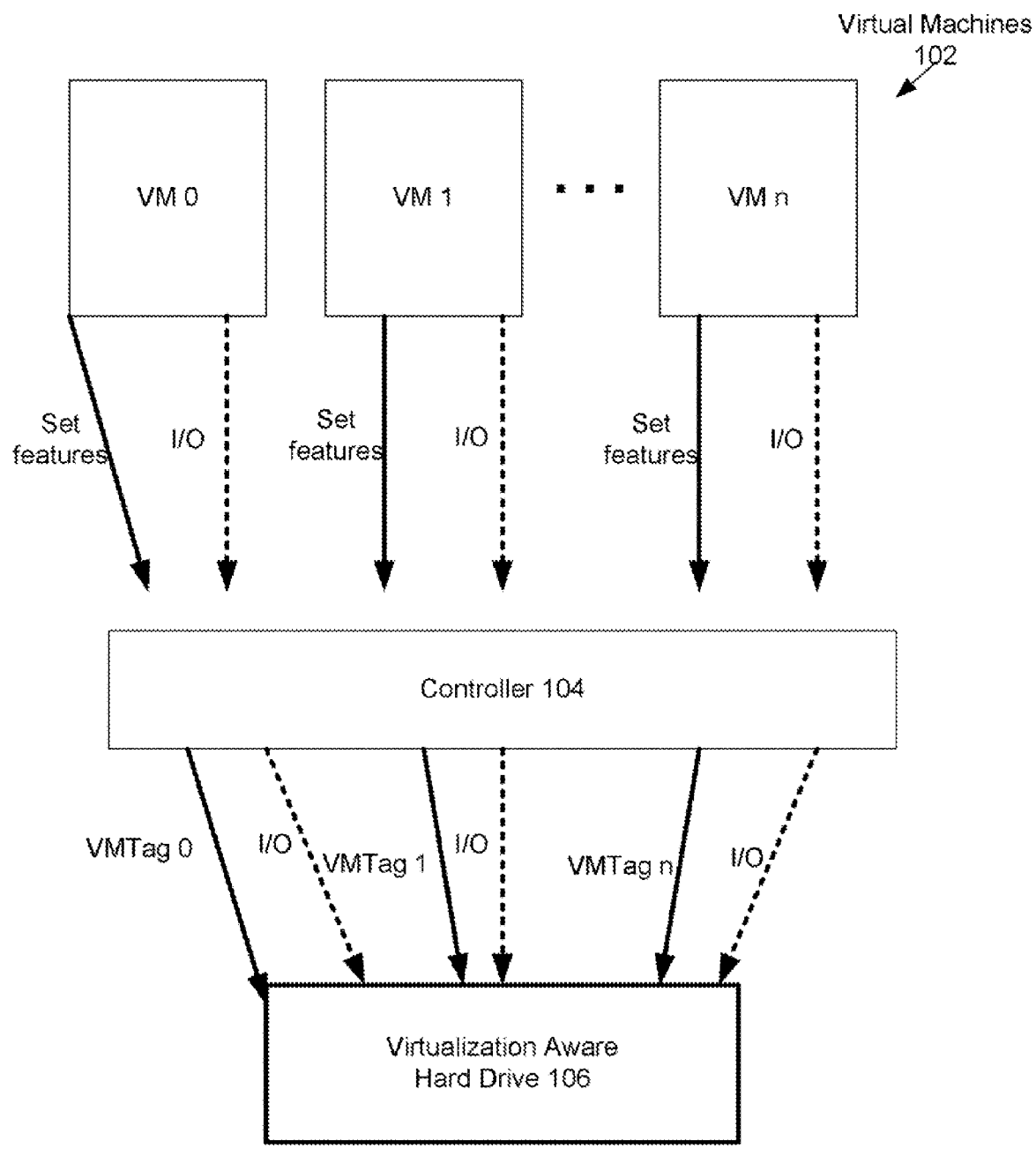
FIG. 1 illustrates one embodiment of a system.

FIG. 1 illustrates an environment for the invention, in which some embodiments may operate. In FIG. 1, the invention is implemented via an embodiment of a virtualized platform. Referring to FIG. 1, the environment includes, but is not necessarily limited to, one or more virtual machines 102 (VM 0-VM n, where n is any positive integer), a controller 104 and a virtualization aware hard drive 106. Each of these elements or components is described next in more detail.

In an embodiment, virtualization aware hard drive 106 is a hard drive that has been informed that it is on a platform that can have multiple virtual machines running and that it is being shared between those virtual machines. In an embodiment of the invention, hard drive 106 may be a Serial ATA (SATA) hard drive, for example. Each of virtual machines 102 issue context commands to controller 104. A context command may include any command that is used to set context in hard drive 106. The purpose of the context commands is to inform virtualization aware hard drive 106 how each of the virtual machines 102 wants hard drive 106 to behave when an I/O command is issued to drive 106 by the particular virtual machine. In embodiments, example context commands may include SET FEATURES and SET MULTIPLE commands. These example context commands are provided for illustration purposes only and are not meant to limit the invention.

In an embodiment, the host hardware or controller 104 fills in a VMTag that corresponds to the virtual machine that issued the I/O command. In an embodiment of the invention, controller 104 may be a SATA controller, for example. VMTags may be filled in by either hardware, software, or some combination of both hardware and software and may be any type of context tag. In an embodiment, controller 104 fills in VMTags in a command (e.g., a Host to Device Register FIS) corresponding to the virtual machine that issued the I/O command.

In an embodiment, the hardware may expose separate register interfaces to each of the virtual machines. Accordingly, controller 104 knows to fill in a VMTag based on which particular register interface issued the I/O command. This embodiment allows the hardware to easily arbitrate and know when commands can be sent from another virtual machine.

Controller 104 arbitrates between virtual machine issued I/O commands and ensures that an I/O command from one virtual machine is not sent to virtualization aware hard drive 106 while another virtual machine has one or more outstanding I/O commands on hard drive 106. In an embodiment not meant to limit the invention, Native Command Queuing may be utilized. Here, each virtual machine may have up to eight commands at a time at hard drive 106 waiting for completion. All commands may be prioritized at hard drive 106 and are completed "in turn."

Figure 2:
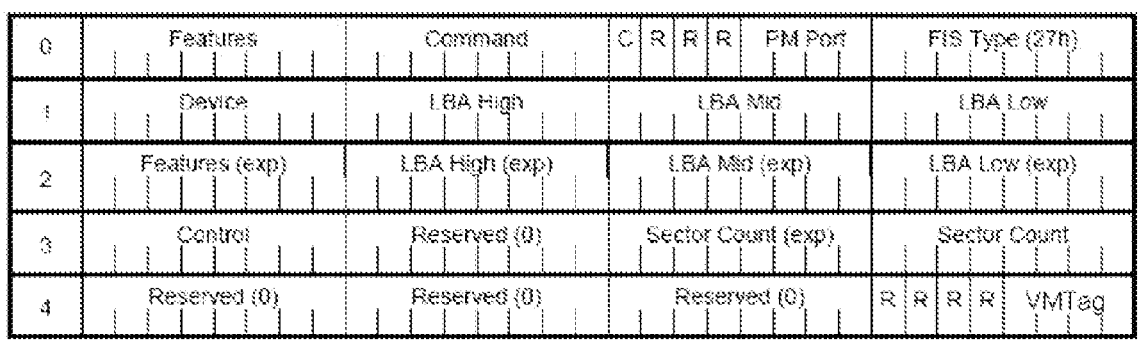
FIG. 2 illustrates one embodiment of a context tag or VMTag.

An exemplary VMTag 202 is illustrated in FIG. 2. In an embodiment, a VMTag may be used to provide virtual machine context to virtualization aware hard drive 106 on each I/O command issued from a virtual machine. VMTag 202 may be added to a command (e.g. the SATA Host to Device Register FIS) that is used to issue new commands. The VMTag allows hard drive 106 to know from which virtual machine the I/O command originated and to apply the correct settings for that particular virtual machine when processing the given I/O command. The exemplary VMTag in FIG. 2 is provided for illustration purposes only and is not meant to limit the invention. In fact, a VMTag may be any type of context tag having varying bit values.

Once virtualization aware hard drive 106 is instructed to monitor for VMTags (via a context command or a new command created to enable virtualization, for example), hard drive 106 begins storing settings that each virtual machine may have sent to it. For example, VM 0 may want hard drive 106 to have the write cache enabled and VM 1 may want hard drive 106 to have the write cache disabled. Here, hard drive 106 associates the write cache state with the appropriate VMTag passed to it with the incoming I/O command. This allows hard drive 106 to use the write cache when an I/O command is issued from VM 0, but data is written directly to the storage media, when an I/O command is issued from VM 1. The result is higher performance for VM 0 and higher reliability for VM 1, as requested by each virtual machine.

Other policies may also be maintained by virtualization aware hard drive 106. An example is power management of hard drive 106. For example, VM 0 may want to spin the drive down while VM 1 is still issuing an I/O command to hard drive 106. Allowing VM 0 to spin down a typical hard drive while an I/O command is still being issued from VM 1 would likely result in hard drive timeouts. Here, the I/O command from VM 1 would cause the hard drive to have to spin back up in order to satisfy the I/O request. To resolve this, virtualization aware hard drive 106 may inform VM 1 to continue processing its I/O command. Once VM 1 requests hard drive 106 to spin down, then hard drive 106 spins down if there are no other virtual machines issuing I/O commands. Here, virtualization aware hard drive 106 only completes the request to spin down once all virtual machines in the platform have requested it to do so.

As mentioned above, in embodiments where hardware (e.g., the controller) fills in the VMTags and arbitrates between virtual machine issued I/O commands, the virtualization aware hard drive relieves the burden of the VMM in a virtualized platform from trapping all input/output (I/O) commands to the hard drive. In an embodiment, hardware updates to support this feature are straightforward and fairly minor. As described above and in an embodiment, the hardware may expose separate register interfaces to each of the virtual machines. Accordingly, controller 104 knows to fill in a VMTag based on which particular register interface issued the I/O command. This embodiment allows the hardware to easily arbitrate and know when commands can be sent from another virtual machine. One possible implementation is via PCI endpoints. For example, and in an embodiment, the I/O controller hub (ICH) is adapted to support peripheral component interconnect (PCI) shared endpoints. The VMTags would then be filled in based on which PCI endpoint the I/O command was issued.

Figure 3:
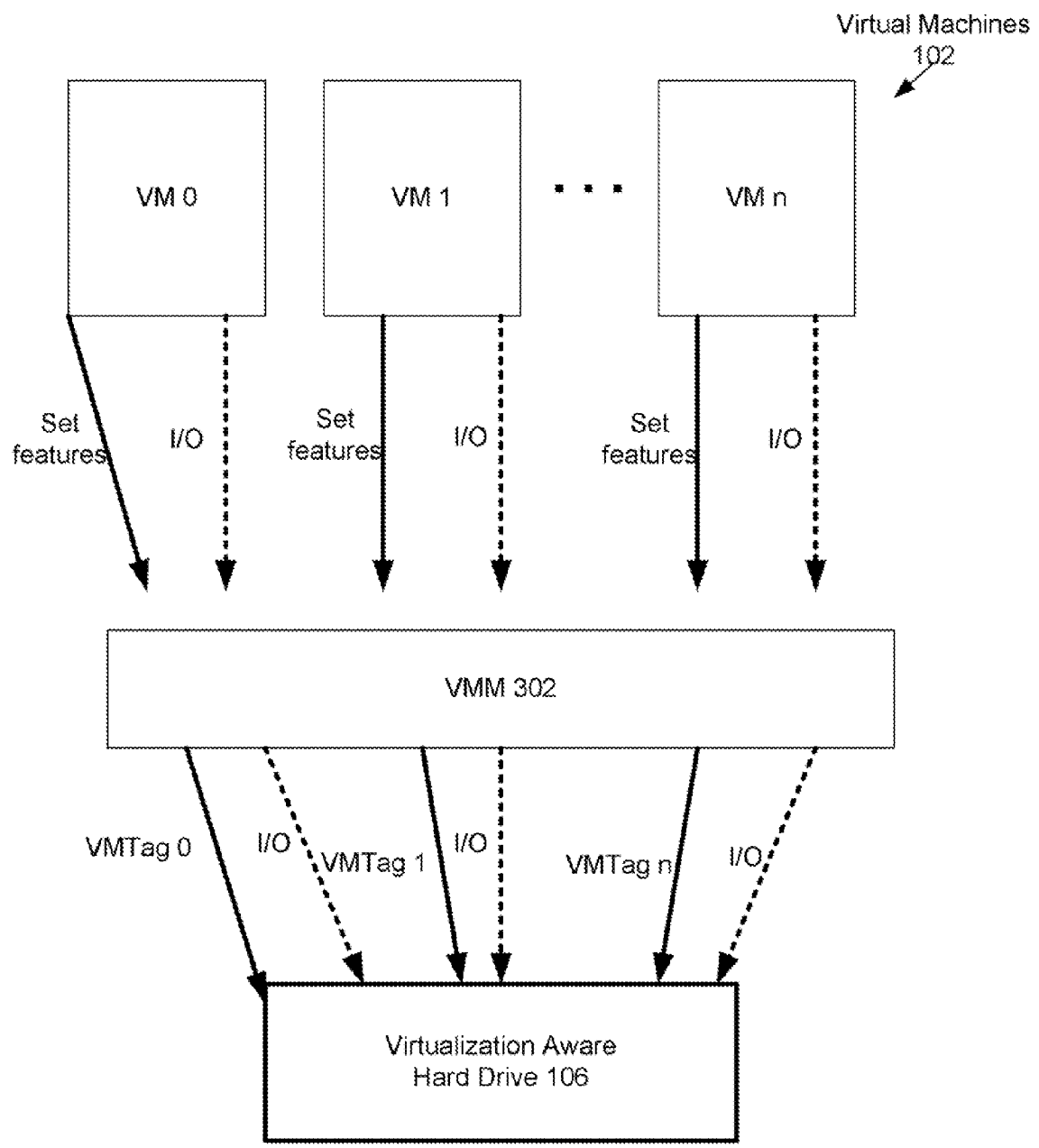
FIG. 3 illustrates one embodiment of a system.

FIG. 3 illustrates an environment for the invention, in which some embodiments may operate. In FIG. 3, the invention is implemented via an embodiment of a virtualized platform. Referring to FIG. 3, a VMM 302 acts as host software to fill in VMTags in a command (e.g. Host to Device Register FIS) corresponding to the virtual machine that issued the I/O command. Here, VMM 302 does not have to issue its own context command (with the best common denominator setting). Instead, VMM 302 passes the context through with only updating the VMTag field in the command (e.g., Host to Device Register FIS). VMM 302 arbitrates the I/O commands between the virtual machines to avoid I/O collisions, as in the hardware example described above with reference to FIG. 1. In embodiments where the VMM fills in the VMTags and arbitrates between virtual machine issued I/O commands, the virtualization aware hard drive relieves the VMM of the burden of issuing feature setting changes on virtual machine switches, but the VMM still has the burden of trapping all I/O commands to fill in the VMTags.

In an embodiment, a combination of host hardware and software may be utilized by the invention. For example, the VMM may control I/O arbitration but does not issue context commands itself. The VMM may detect a virtualization aware hard drive and thus passes the context from each virtual machine through to the hard drive. Then, a hardware controller (such as controller 104 of FIG. 1) may fill in the VMTag field for every I/O command issued by the virtual machines.

It is important to note that in embodiments, the invention is also useful even when trapping with the VMM and using software based virtualization techniques or when para-virtualization is used. For example, assume that VM 0 wants to ensure optimal performance for tasks such as gaming, video capture, etc. Further assume that VM 1 wants to ensure continual data integrity (even across power failure, for example). Here, VM 0 will want the write cache enabled on the hard drive, while VM 1 will want the write cache disabled. By allowing the platform to pass the VMTag (virtual machine context) to virtualization aware hard drive 106, it can use the write cache for I/O commands issued from VM 0 and access the hard drive media directly for I/O commands issued from VM 1.

The operation of FIGS. 1 and 3 are described next with reference to FIG. 4. Operations for the above embodiments may be further described with reference to the following figure and accompanying examples. Although such figure presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof.

Figure 4:
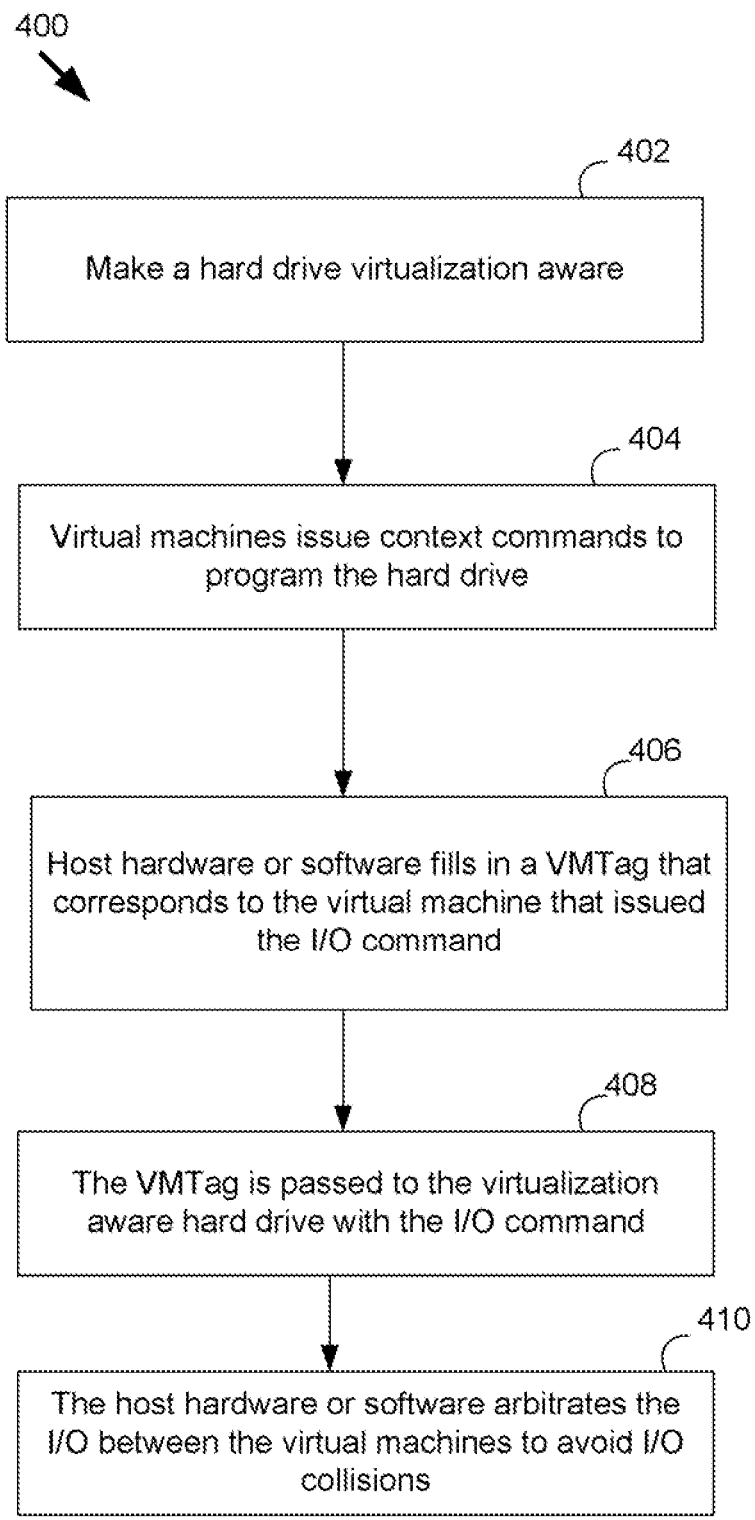
FIG. 4 illustrates one embodiment of a logic flow.

FIG. 4 illustrates one embodiment of a logic flow 400. As shown in logic flow 400, a hard drive is made virtualization aware (block 402). As described above, a virtualization aware hard drive (such as hard drive 106 of FIG. 1) may be a hard drive that has been informed that it is on a platform that can have multiple virtual machines running and that it is being shared between those virtual machines.

Virtual machines (such as virtual machines 102 in FIG. 1) issue context commands to program the virtualization aware hard drive (block 404). As described above, the purpose of the context commands is to inform the virtualization aware hard drive how each of the virtual machines wants the drive to behave when an I/O command is issued by a particular virtual machine.

Host hardware (such as controller 104 of FIG. 1) or host software (such as VMM 302 of FIG. 3) fills in a VMTag that corresponds to the virtual machine that issued the I/O command (block 406). VMTags may be filled in by either hardware, software, or some combination of both hardware and software. As described above, the VMTags may be stored in a command (e.g., Host to Device Register FIS) corresponding to the virtual machine that issued the I/O command.

The VMTag is passed to the virtualization aware hard drive with the I/O command (block 408). As described above, the virtualization aware hard drive uses the VMTag and context to know how the particular virtual machine wants the hard drive to behave with regard to the issued I/O command.

The host hardware, software or some combination of both arbitrates the I/O commands between the virtual machines to avoid I/O collisions (block 410).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that teens such as "processing," "computing," "calculating," "determining" or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
causing a context command and an input/output (I/O) command to be issued by a virtual machine, the context command including settings from the virtual machine to control how a hard drive processes the I/O command issued by the virtual machine, wherein the hard drive is aware that it is operating in a virtual machine environment;
causing a context tag corresponding to the context command to be generated, the context tag used by the hard drive to associate the virtual machine with the I/O command and apply the settings for the virtual machine when processing the I/O command; and
providing the context tag and the I/O command to the hard drive.

2. The method of claim 1, wherein the context command and the I/O command are issued to a hardware controller, and wherein the hardware controller causes the context tag to be generated.

3. The method of claim 2, wherein the virtual machine is exposed to a register interface, and wherein the hardware controller generates the context tag based on the register interface issuing the I/O command.

4. The method of claim 2, wherein the context tag is located in a command corresponding to the virtual machine.

5. The method of claim 2, wherein the hardware controller is to arbitrate between the I/O command issued by the virtual machine and an I/O command issued by another virtual machine.

6. The method of claim 2, wherein the hardware controller is to arbitrate between the I/O command issued by the virtual machine and I/O commands issued by other virtual machines, wherein the I/O command issued by the virtual machine and the I/O commands issued by the other virtual machines are prioritized for completion by the hard drive.

7. The method of claim 1, wherein the context command and the input/output (I/O) command are issued to a virtual machine monitor (VMM) and the VMM is to generate the context tag.

8. The method of claim 7, wherein the context tag is located in a command corresponding to the virtual machine.

9. The method of claim 7, wherein the VMM is to arbitrate between the I/O command issued by the virtual machine and an I/O command issued by another virtual machine.

10. The method of claim 7, wherein the VMM is to arbitrate between the I/O command issued by the virtual machine and I/O commands issued by other virtual machines, wherein the I/O command issued by the virtual machine and the I/O commands issued by the other virtual machines are prioritized for completion by the hard drive.

11. A system, comprising:
a first virtual machine to issue a first context command and a first input/output (I/O) command, the first context command to include a first set of information that controls how a hard drive processes the first I/O command;
a second virtual machine to issue a second context command and a second input/output (I/O) command, the second context command to include a second set of information that controls how the hard drive processes the second I/O command, wherein the hard drive is to be aware that it is to operate on a platform that includes at least the first virtual machine and the second virtual machine, and wherein the hard drive is to be aware that the first I/O command is associated with the first virtual machine and the second I/O command is associated with the second virtual machine based on a first context tag and a second context tag respectively.

12. The system of claim 11, wherein the first virtual machine is exposed to a first register interface and the second virtual machine is exposed to a second register interface and wherein a hardware controller knows to fill in the first or second context tag based on whether the first or second register interface issued the first or the second I/O command respectively.

13. The system of claim 11, wherein the first or the second context tag is located in a command corresponding to the first or the second virtual machine respectively.

14. The system of claim 11, wherein the hardware controller is to arbitrate between the first I/O command and the second I/O command.

15. The system of claim 11, wherein the hardware controller is to arbitrate between the first I/O command, the second I/O command and I/O commands issued by other virtual machines, wherein the first I/O command, the second I/O command and the I/O commands issued by the other virtual machines are prioritized for completion by the hard drive.

16. The system of claim 11, wherein the hard drive is to monitor for the first context tag and the second context tag.

17. The system of claim 11, wherein the hard drive is to relieve a virtual machine monitor (VMM) from trapping all I/O commands to the hard drive.

18. A system, comprising:
a first virtual machine to issue a first context command and a first input/output (I/O) command;
a second virtual machine to issue a second context command and a second input/output (I/O) command;
a virtual machine monitor (VMM) to fill in a first context tag that corresponds to the first context command and the first I/O command and to fill in a second context tag that corresponds to the second context command and the second I/O command; and
a hard drive to use the first context tag to provide context for the first I/O command and to use the second context tag to provide context for the second I/O command, wherein the hard drive is to be informed that it is to be shared among multiple virtual machines including at least the first virtual machine and the second virtual machine.

19. The system of claim 18, wherein the first context tag is located in a command corresponding to the first virtual machine and the second context tag is located in a command corresponding to the second virtual machine.

20. The system of claim 19, wherein the VMM is to arbitrate between the first I/O command and the second I/O command.

21. The system of claim 18, wherein the VMM is to arbitrate between the first I/O command, the second I/O command and I/O commands issued by other virtual machines, wherein the first I/O command, the second I/O command and the I/O commands issued by the other virtual machines are prioritized for completion by the hard drive.

22. The system of claim 18, wherein the hard drive is to relieve the VMM from issuing feature setting changes on virtual machine switches.

* * * * *

UNITED STATES PATENT AND TRADEMARK OFFICE
CERTIFICATE OF CORRECTION

PATENT NO.         : 8,001,282 B2                                Page 1 of 1
APPLICATION NO.    : 11/769232
DATED              : August 16, 2011
INVENTOR(S)        : James A. Boyd et al.

It is certified that error appears in the above-identified patent and that said Letters Patent is hereby corrected as shown below:

In column 8, line 35, in Claim 20, delete "claim 19," and insert -- claim 18, --, therefor.

Signed and Sealed this
Fourteenth Day of August, 2012

David J. Kappos
*Director of the United States Patent and Trademark Office*